H. M. NICHOLS.
AUTOMOBILE INDICATOR.
APPLICATION FILED JAN. 18, 1916.
1,237,082. Patented Aug. 14, 1917.
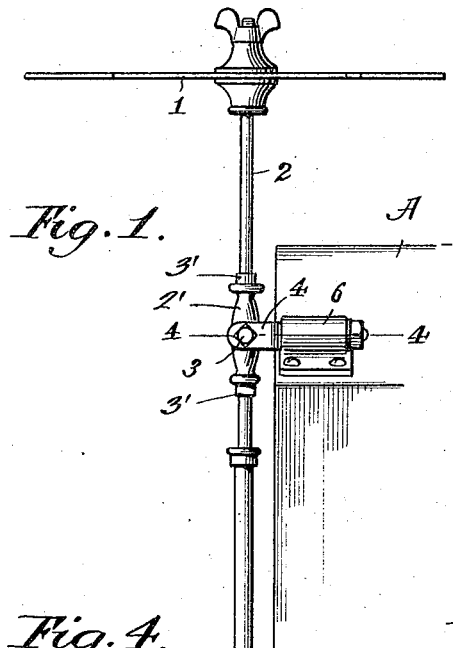
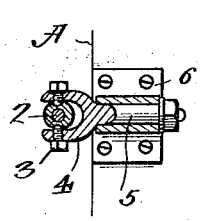
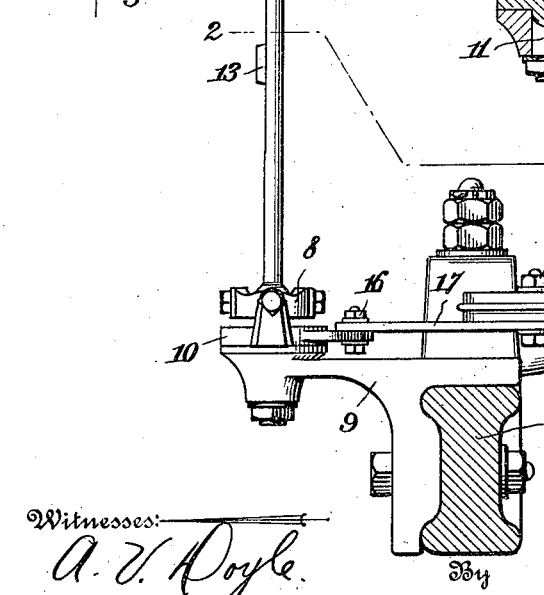
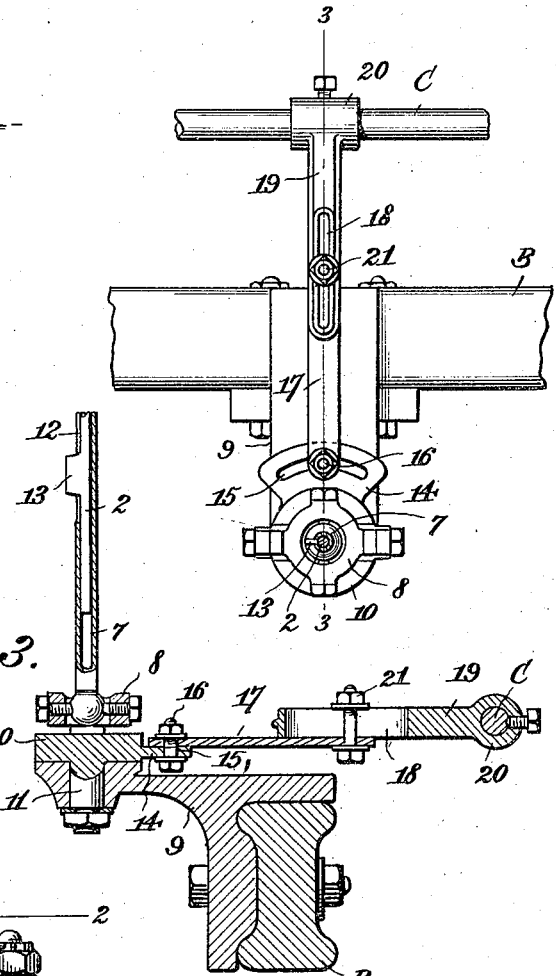
Witnesses: A. V. Doyle
Inventor,
Henry M. Nichols
By Victor J. Evans,
Attorney.

UNITED STATES PATENT OFFICE.

HENRY M. NICHOLS, OF PATERSON, NEW JERSEY.

AUTOMOBILE-INDICATOR.

1,237,082.  Specification of Letters Patent.  Patented Aug. 14, 1917.

Application filed January 18, 1916. Serial No. 72,813.

*To all whom it may concern:*

Be it known that I, HENRY M. NICHOLS, a citizen of the United States, residing at Paterson, in the county of Passaic and State of New Jersey, have invented new and useful Improvements in Automobile-Indicators, of which the following is a specification.

This invention relates to direction or course indicators for automobiles.

The invention may be used upon automobiles or other mechanically propelled vehicles which are intended to travel over the usual public highways and an object of the invention is to provide indicating mechanism therefor which will be operable to guide the operator in his effort, at a time of emergency, to direct the vehicle along a true and definite line.

The mechanism herein employed is intended to assist and guide the operator at such time when the vehicle skids and danger is imminent and it becomes immediately necessary to right the machine and permit the operator to guide the same to a place of safety upon the highway.

Under the present construction of an automobile the hand steering wheel must be turned to considerable extent in order to change the angularity of the steering wheels relatively of the longitudinal line of the car in order to direct the latter in the requisite course. It is very common, during the moment of sudden excitement of the operator when the machine is skidding that he turn the steering wheel suddenly and too much in the same direction with a view to righting the car, and as a result thereof the car may be made to glide to the opposite side of the roadway and brought into direct contact with dangerous obstructions, or possibly the car may be completely thrown over. It is this uncertainty in the operation of the steering mechanism which I have fully eliminated. The device or mechanism which will be hereinafter specifically referred to consists of a means whereby the operator, by looking straight ahead will at once observe the direction or line of path toward which the car will proceed, by observing the indicator arrow with which the device is provided. In this manner the operator will see immediately the direction in which the car will go as the indicator is made to respond through the angularity of the steering wheels.

Aside from instantly presenting to the operator any change in the direction of the front wheels for the purpose of preventing undue and dangerous skidding, it is found that the operator may obtain perfect control of the car.

With these and other objects in view, the invention consists in the construction and novel combination and arrangement of parts hereinafter fully described and illustrated in the accompanying drawings, it being understood that various changes in the form, proportions, and minor details of construction may be resorted to without departing from the principal or sacrificing any of the advantages of this invention within the scope of the appended claims.

In the drawings forming a part of this specification and in which like reference numerals indicate similar parts in the several views, Figure 1, is a side view of the indicator showing the application of the same to coacting parts of an automobile, parts being shown in section.

Fig. 2, is a horizontal section taken on the line 2—2 of Fig. 1.

Fig. 3, is a vertical section taken on the line 3—3 of Fig. 2.

Fig 4, is a section on the line 4—4 of Fig. 1.

Fig. 5 is a plan view of an arrow used on the device.

The indicator consists of an arrow 1, mounted upon a vertical rod 2, and fixed to said rod in any suitable well known manner. This rod passes through a sleeve 2' which is pivotally connected at 3 with a rocking support 4, the latter having a stem 5, which is free to oscillate in a bracket 6, fixed to the radiator A of the car. Collars 3' are mounted on the rod 2 and bear against the ends of the sleeve 2' and hold the rod against longitudinal movement in the sleeve. This rod freely telescopes within a tube 7, which extends in a downward direction toward the front axle B, where it is connected by a universal joint 8, with a bracket 9 secured to said axle. The element 10 carries a depending stem 11, which is free to turn in a horizontal direction in the bracket 9.

The tube 7, and the mentioned rod 2, are constructed according to what may be mechanically obvious whereby the latter will not rotate in the former. As one way of accomplishing this purpose the tube 7, is provided with a vertical slot 12, through which a lug 13 on the rod 2, extends. By this construction all of the parts of the indicator are freely responsive to the many peculiar angular changes of the front wheels relatively of the body of the car, as well as movement in a vertical direction of the body relatively of the wheels.

The arrow points straight ahead and its axis should, under all normal conditions be parallel with the longitudinal center of the car indicating that the front wheels are in true alinement with the rear wheels. Uniform traction action of all the wheels against the roadway may then be had.

In order that controlling movements may be imparted to the arrow provision is made of an extension plate 14, on the element 10. This plate has an arcuate slot 15, which fixedly accommodates a bolt 16, passing from the forward end of a link or bar 17. The rear end of this bar is extended under a longitudinal slot 18, in a controlling bar 19, secured at 20 to the usual steering rod C. In some cars the steering rod may be disposed at a greater or less distance from the axle B, than in other cars and hence the slot 18, and the bolt 21, which passes through the bar 17 are provided to compensate for such variation. It is now observed that the steering movements of the rod C will be transmitted to the element 10, which is turned, and the said element turns the tube 7 and shaft 2 whereby the arrow 1 will indicate the direction in which the wheels of the vehicle are directed.

What is claimed as new is:

1. An automobile indicator comprising a bracket adapted to be applied to the axle, an element turnably mounted thereon, means for operatively connecting said element with the steering rod, a tube having universal joint connection with said element, a shaft slidably mounted in the tube and constrained to turn with the same, means for holding the shaft against longitudinal movement with relation to the body, means for supporting the shaft from the body of the automobile, and an indicator carried by the shaft.

2. An automobile indicator comprising a bracket adapted to be applied to the axle, an element turnably mounted thereon and having an arcuate slot, a link adjustably connected with the element at the slot, a bar slidably connected with the link and adapted to be connected with the steering rod, a tube having universal joint connection with said element, a shaft slidably mounted in the tube and constrained to turn with the same, means for supporting the shaft from the body of the automobile, means for holding the shaft against longitudinal movement with relation to the body and an indicator carried by the shaft.

In testimony whereof I, affix my signature in presence of two witnesses.

HENRY M. NICHOLS.

Witnesses:
ADAM S. SHEARER,
WALTER HARRIS.

Copies of this patent may be obtained for five cents each, by addressing the "Commissioner of Patents, Washington, D. C."